United States Patent [19]

Mink

[11] Patent Number: 4,720,979
[45] Date of Patent: Jan. 26, 1988

[54] AIR SUPPLY BUSHING ARRANGEMENT FOR A GAS TURBINE ENGINE COMBUSTION CHAMBER

[75] Inventor: Paul Mink, Unterschleissheim, Fed. Rep. of Germany

[73] Assignee: MTU Motoren-und Turbinen-Union, Munich, Fed. Rep. of Germany

[21] Appl. No.: 915,101

[22] Filed: Oct. 3, 1986

[30] Foreign Application Priority Data

Oct. 4, 1985 [DE] Fed. Rep. of Germany ....... 3535443

[51] Int. Cl.$^4$ .......................... F02C 1/00; F02G 3/00
[52] U.S. Cl. ......................................... 60/752; 60/39.32
[58] Field of Search ................. 60/757, 760, 759, 755, 60/752, 39.21, 39.32

[56] References Cited

U.S. PATENT DOCUMENTS 3,545,202 12/1970 Batt et al. ............................ 60/757
4,454,711 6/1984 Ben Porat .......................... 60/39.32

FOREIGN PATENT DOCUMENTS 1933821 9/1970 Fed. Rep. of Germany .
2913223 10/1979 Fed. Rep. of Germany .

Primary Examiner—Louis J. Casaregola
Assistant Examiner—Timothy S. Thorpe
Attorney, Agent, or Firm—Barnes & Thornburg

[57] ABSTRACT

An air supply bushing arrangement is disclosed for radial bridging of a double-walled flame tube structure. The bushings are designed to be inserted in a readily interchangeable fashion in the respective openings of an outer and inner flame tube section, each bushing having an annular spring element which is compressed upon insertion and which, after the bushing has reached the operating position, snaps into a circumferential groove disposed at the edge of the opening of one of the two flame tube sections.

10 Claims, 2 Drawing Figures

AIR SUPPLY BUSHING ARRANGEMENT FOR A GAS TURBINE ENGINE COMBUSTION CHAMBER

BACKGROUND AND SUMMARY OF THE INVENTION

The invention relates to a gas turbine combustion chamber of the type having a double-walled annular flame tube.

Air supply bushings are required in combustion chambers of this type, for example, fully or partially to fulfill the combustion mixing or cooling air requirements for the various reaction zones in the combustion chamber.

The air supply bushings must be so arranged that, despite the double-walled nature of the flame tube structure, an air throughput, unimpeded as regards volume and speed, is permitted from the external secondary air channel, between the flame tube and the combustion chamber outer housing, into the various reaction zones.

In combustion chambers of the type recited hereinabove, known from German Published Unexamined Patent Applications OS 19 33 821 and OS 29 13 223, the air supply bushings are permanently integrated into the flame tube structure and welded, for example, to the flame tube structure or, as additionally mentioned and shown in the case of German OS 29 13 223, suspended in an essentially nonremovable fashion from the outer flame tube wall, leaving a combined axial-radial play.

In a double-walled flame tube structure, the inner wall segments as well as the end segments of the air supply bushings, which are located primarily in the inner wall segment area, are exposed to a comparatively high temperature or temperature change stress by the combustion process, with the associated danger of burning away or corrosion by hot gases.

Since removal of one or more damaged air supply bushings is practically impossible for the mounting reasons referred to above, to the extent that it is even possible, it necessitates replacement of the flame tube wall parts affected and in extreme cases, replacement of the entire combustion chamber.

Usually, local repair of a damaged air supply bushing is impossible for safety reasons, not to mention the associated costs and time involved.

The shortcomings mentioned above also apply when, for example, the air supply bushings are intact but the flame tube structures are damaged, in which case one would be obliged to replace the damaged flame tube structures or the entire flame tube without putting back the intact bushings.

Assembly and disassembly difficulties occur with bushings that are permanently installed in the double-walled structure, especially when, as is increasingly the case in recent annular combustion chambers in gas turbine engines, the inner flame tube parts which are exposed to the hot or combustion gas stream are made of segments which extend lengthwise of the chamber and are staggered in the manner of shingles or scales. This is especially true when the segments or strip elements, because of their intrinsic assembly or for thermal stress reasons, are supposed to be pushed in the axial direction into the flame tube parts that are designed as outer or inner supporting elements, or are supposed to be pulled out of the latter, or suspended from them.

An object of the invention is to provide an air supply bushing which, relative to the predetermined flame tube double-walled structure, is readily interchangeable or extremely simply installed or demountable.

This stated object is achieved according to the invention by providing resilient retention means for detachably resiliently retaining the air supply bushings at one of the flame tube segments. With this arrangement the air supply bushing in question can be inserted very simply by hand, without special fitting measures, into the corresponding openings in the outer and inner flame tube segments of a double-walled flame tube structure and can likewise be pulled out easily again from the openings. In especially advantageous embodiments, the resilient annular spring element is used as the retention means.

In especially preferred embodiments, the air supply bushing is provided with a groove which accomodates compression of the locking ring to permit manual insertion of the bushing to a position where the ring resiliently and automatically snap-fittingly engages at the flame tube wall segment.

In certain preferred embodiments, access openings are provided in the flame tube segments to accommodate manual engagement of the locking ring to compress same for disassembly.

Further objects, features, and advantages of the present invention will become more apparent from the following description when taken with the accompanying drawings which show, for purposes of illustration only, several embodiments in accordance with the present invention.

DETAILED DESCRIPTION OF THE DRAWINGS

Figure 1:
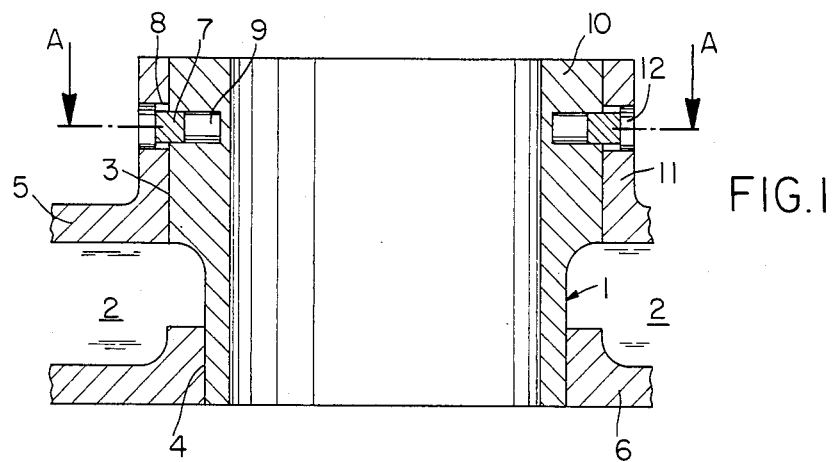
FIG. 1 is a central lengthwise section through an air supply bushing inserted between outer and inner flame tube segments of a gas turbine engine constructed according to a preferred embodiment of the invention.
Figure 2:
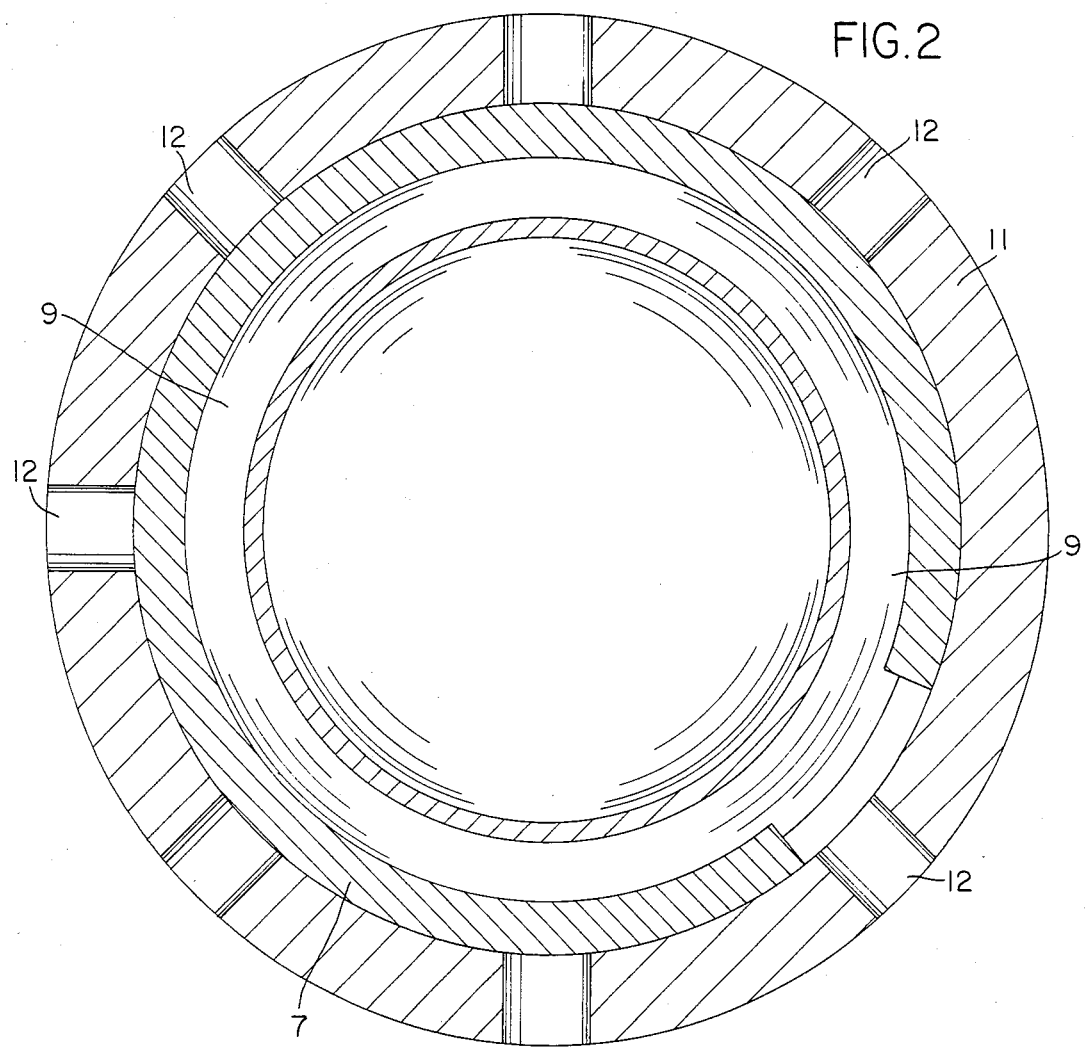
FIG. 2 is a section along A—A in FIG. 1, but on an enlarged scale.

FIGS. 1 and 2 show an air supply bushing 1, provided for the annular combustion chamber of a gas turbine engine, said bushing 1 being inserted, with radial bridging of an intermediate space 2 of a double-walled flame tube structure, into axially symmetrical openings 3, 4 of an outer (5) and inner (6) flame tube section. According to the invention the air supply bushing 1 has an annular spring element 7 which is compressed when inserted and, when bushing 1 has reached its operating end position, snaps into a circumferential groove 8 provided at the edge of the opening of, in this case, outer flame tube section 6. In order to insert air supply bushing 1 without difficulty, spring element 7, which is designed as a split locking ring, is designed to be completely sinkable within a circumferential groove 9 of a bushing end part 10 and, when it has completely snapped back as shown in FIG. 1, covers open circumferential grooves 9, 8 which face each other in bushing 1 and on the flame tube opening edge, each halfway.

Bushing end part 10 has a rotationally symmetrically expanded centering section which fits into a collar-shaped projection 11 (FIG. 2) which contains opening 3 of outer flame tube section 5, said projection 11 having through holes 12 which are uniformly distributed over the circumference and are accessible from the outside, for accommodating complete compression of spring element 7.

Advantageously, collar-shaped projection 11 is basically a component of outer flame tube section 5.

In another embodiment, air supply bushing 1 is made from an engineering ceramic high-temperature material with a low coefficient of thermal expansion, for example, from silicon nitride or silicon carbide, for low susceptibility to wear as well as for the closest possible fit with play without serious danger of jamming.

The subject of the invention is also advantageously usable in modern annular combustion chambers in which outer flame tube section 5 is a component of a flame tube supporting element structure and inner flame tube section 6 is a component of lining strips which can be attached to the supporting element structure in the axial direction and is designed to be staggered in the manner of shingles or scales in the lengthwise direction of the chamber. In this case, air supply bushing 1 can easily be installed after inner strip 6 is pushed in or, before the latter is pulled out, can be easily removed from openings 3, 4 by loosening the spring lock. For example, this arrangement could advantageously be used with the arrangement disclosed in commonly assigned U.S. Pat. application Ser. No. 915,102, filed on even date herewith and based on German P 35 35 442.9.

Advantageously, air supply bushing 1 is installed with axial and radial play in the corresponding flame tube openings 3, 4 in order not only to ensure simple installation and/or disassembly but also to provide for unimpeded radial expansion movements of the combustion chamber of flame tube sections 5, 6 as well as any differential expansions of these segments in the axial and circumferential directions without any danger of the bushing jamming.

While I have shown and described several embodiments in accordance with the present invention, it is understood that the same is not limited thereto, but is susceptible of numerous changes and modifications as known to those skilled in the art, and I therefore do not wish to be limited to the details shown and described herein but intend to cover all such changes and modifications as are encompassed by the scope of the appended claims.

I claim:

1. Combustion chamber arrangement for a gas turbine engine of the type having a double-walled annular flame tube composed of spaced apart inner and outer flame tube wall segments, said arrangement comprising:
   air supply busing means for interconnecting air openings in the respective inner and outer flame tube segments whereby air flow is accommodated from outside the outer flame tube segment to inside the inner flame tube segment,
   and resilient retention means for detachably resiliently retaining the air supply bushing means at one of the inner and outer flame tube segments, said resilient retention means including spring element means engageable in an annular groove at one of the inner and outer flame tube segments.

2. An arrangement according to claim 1, wherein said spring element means includes an annular spring element which snap-fittingly engages in a groove at one of the inner and outer flame tube segments.

3. An arrangement according to claim 2, wherein said bushing means includes a bushing annular groove for accommodating the annular spring element, said bushing annular groove being configured to accommodate radially inward conpression of annular spring element to a position permitting insertion movement of the bushing means into a cylindrical opening in said one of the flame tube segments to a position where the annular spring element moves radially outwardly into a flame tube annular groove in the flame tube segment to snap-fittingly lock the bushing means in position.

4. An arrangement according to claim 3, wherein the bushing has a rotationally symmetrically expanded centering section which fits into a collar-shaped projection which contains an air opening of one of the flame tube segments, said projection having through holes distributed around the circumference thereof and accessible from the outside for accommodating access to and complete compression of the spring element, whereby the bushing can be readily detached.

5. An arrangement according to claim 4, wherein the collar-shaped projection is a component of the outer flame tube segment.

6. An arrangement according to claim 1, characterized by the fact that the air supply bushing is made from an engineering ceramic high-temperature material with a low coefficient of thermal expansion.

7. An arrangement according to claim 4, characterized by the fact that the air supply bushing is made from an engineering ceramic high-temperature material with a low coefficient of thermal expansion.

8. An arrangement according to claim 1, further comprising an inner and an outer flame tube segment, wherein the outer flame tube segment is a component of a flame tube supporting element structure, and the inner flame tube segment is a component of inner lining strips designed in a manner of shingles or scales mountable in the axial direction on the supporting element structure and extending lengthwise of the chamber,
   and wherein the air supply bushing is configured for accommodating insertion thereof after inserting the corresponding inner lining strip and for accommodating removal thereof by loosening the resilient retention means.

9. An arrangement according to claim 8, wherein the bushing has a rotationally symmetrically expanded centering section which fits into a collar-shaped projection which contains an air opening of one of the flame tube segments, said projection having through holes distributed around the circumference thereof and accessible from the outside for accommodating access to and complete compression of the spring element, whereby the bushing can be readily detached.

10. An arrangement according to claim 1, wherein a plurality of said air bushings are arranged around the combustion chamber.

* * * * *